(12) United States Patent
Frenkel et al.

(10) Patent No.: US 8,751,857 B2
(45) Date of Patent: Jun. 10, 2014

(54) MONITORING OF HIGHLY AVAILABLE VIRTUAL MACHINES

(75) Inventors: Omer Frenkel, Tel Aviv (IL); Vitaly Elyashev, Ramat Gan (IL)

(73) Assignee: Red Hat Israel, Ltd., Raanana (IL)

( * ) Notice: Subject to any disclaimer, the term of this patent is extended or adjusted under 35 U.S.C. 154(b) by 265 days.

(21) Appl. No.: 12/759,014

(22) Filed: Apr. 13, 2010

(65) Prior Publication Data

US 2011/0252271 A1 Oct. 13, 2011

(51) Int. Cl.
*G06F 11/00* (2006.01)
(52) U.S. Cl.
USPC .............. 714/3; 714/4.1; 714/10; 714/48
(58) Field of Classification Search
USPC ............... 714/3, 4.1, 48, 10; 718/1
See application file for complete search history.

(56) References Cited

U.S. PATENT DOCUMENTS

| | | | |
|---|---|---|---|
| 7,213,246 B1 * | 5/2007 | van Rietschote et al. | 718/1 |
| 7,533,229 B1 * | 5/2009 | van Rietschote | 711/161 |
| 7,805,516 B2 * | 9/2010 | Kettler et al. | 709/226 |
| 8,161,321 B2 * | 4/2012 | Zheng et al. | 714/15 |
| 8,171,349 B2 * | 5/2012 | Stern et al. | 714/47.1 |
| 8,175,987 B2 * | 5/2012 | Fickie et al. | 706/13 |
| 8,185,776 B1 * | 5/2012 | Gentes et al. | 714/4.11 |
| 2002/0049869 A1 * | 4/2002 | Ohmura et al. | 710/5 |
| 2002/0099753 A1 * | 7/2002 | Hardin et al. | 709/1 |
| 2005/0132362 A1 * | 6/2005 | Knauerhase et al. | 718/1 |
| 2005/0198303 A1 * | 9/2005 | Knauerhase et al. | 709/227 |
| 2006/0242641 A1 * | 10/2006 | Kinsey et al. | 718/1 |
| 2007/0169121 A1 * | 7/2007 | Hunt et al. | 718/1 |
| 2007/0271561 A1 * | 11/2007 | Winner et al. | 718/1 |
| 2008/0189432 A1 * | 8/2008 | Abali et al. | 709/238 |
| 2008/0189468 A1 * | 8/2008 | Schmidt et al. | 711/6 |
| 2008/0189700 A1 * | 8/2008 | Schmidt et al. | 718/1 |
| 2008/0235477 A1 * | 9/2008 | Rawson | 711/165 |
| 2009/0031307 A1 * | 1/2009 | Chodroff et al. | 718/100 |
| 2009/0119665 A1 * | 5/2009 | Venkitachalam et al. | 718/1 |
| 2010/0017512 A1 * | 1/2010 | Ciano et al. | 709/225 |
| 2010/0037089 A1 * | 2/2010 | Krishnan et al. | 714/5 |
| 2010/0162259 A1 * | 6/2010 | Koh et al. | 718/104 |
| 2010/0174943 A1 * | 7/2010 | Liu et al. | 714/15 |
| 2010/0186010 A1 * | 7/2010 | Chalemin et al. | 718/1 |
| 2010/0211829 A1 * | 8/2010 | Ziskind et al. | 714/48 |
| 2010/0325471 A1 * | 12/2010 | Mishra et al. | 714/3 |
| 2010/0332489 A1 * | 12/2010 | Benari et al. | 707/759 |
| 2011/0004791 A1 * | 1/2011 | Kokubu et al. | 714/57 |
| 2011/0060832 A1 * | 3/2011 | Govil et al. | 709/225 |
| 2011/0107332 A1 * | 5/2011 | Bash | 718/1 |
| 2011/0126197 A1 * | 5/2011 | Larsen et al. | 718/1 |
| 2011/0202795 A1 * | 8/2011 | Marathe et al. | 714/23 |
| 2011/0208908 A1 * | 8/2011 | Chou et al. | 711/112 |
| 2011/0214005 A1 * | 9/2011 | Biran et al. | 714/1 |

* cited by examiner

*Primary Examiner* — Loan L. T. Truong
(74) *Attorney, Agent, or Firm* — Lowenstein Sandler LLP

(57) ABSTRACT

A host controller is coupled to host computers that host virtual machines. At least one of the virtual machines is a highly available virtual machine. The host controller detects a change in system resources and identifies a highly available virtual machine that failed before the change occurs. The host controller re-runs the highly available virtual machine upon detection of the change of the system resources.

20 Claims, 5 Drawing Sheets

MONITORING OF HIGHLY AVAILABLE VIRTUAL MACHINES

TECHNICAL FIELD

Embodiments of the present invention relate to a computer system, and more specifically, to virtual machine management.

BACKGROUND

A virtual machine is a software implementation of a machine (computer) that includes its own operating system (referred to as a guest operating system) and executes application programs. A host computer allocates a certain amount of its resources to each of the virtual machines, and multiplexes its underlying hardware platform among the virtual machines. Each virtual machine is then able to use the allocated resources to execute its guest operating system and applications. The software layer providing the virtualization is commonly referred to as a hypervisor and is also known as a virtual machine monitor (VMM), a kernel-based hypervisor, or part of a host operating system. The hypervisor emulates the underlying hardware of the host computer, making the use of the virtual machine transparent to the guest operating system and the user of the computer.

In a virtualization system, some of the virtual machines may be configured as "highly available." A highly available virtual machine may run critical applications that need to have minimal down time. Thus, there is need for a management system of the virtual machines to ensure that these virtual machines can stay in an up state as much as possible, unless they are stopped by a user.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for monitoring highly available virtual machines. In one embodiment, a host controller is coupled to host computers that host virtual machines. At least one of the virtual machines is a highly available virtual machine. The host controller detects a change in system resources and identifies a highly available virtual machine that failed before the change occurs. The host controller re-runs the highly available virtual machine upon detection of the change in the system resources.

A virtual machine that is designated as highly available needs to maintain minimal down time, unless it is intentionally stopped by a user. Thus, a host controller will try to re-run a highly available virtual machine when the virtual machine fails during runtime. In some scenarios there may be a problem to re-run a virtual machine immediately after its failure. For example, there may be insufficient resources to run the virtual machine on a different host. In these scenarios, the virtual machine stays down and will not automatically come up again. The downtime may be prolonged even though the virtual machine could have been re-run sometime later when there is a change in the system resources.

According to one embodiment of the invention, a highly available virtual machine that fails during runtime is re-run when there is a change to system resources. The host controller monitors the virtual machines and system resources to detect changes in the system resources. As a result, highly available virtual machines can have an increased amount of up time.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
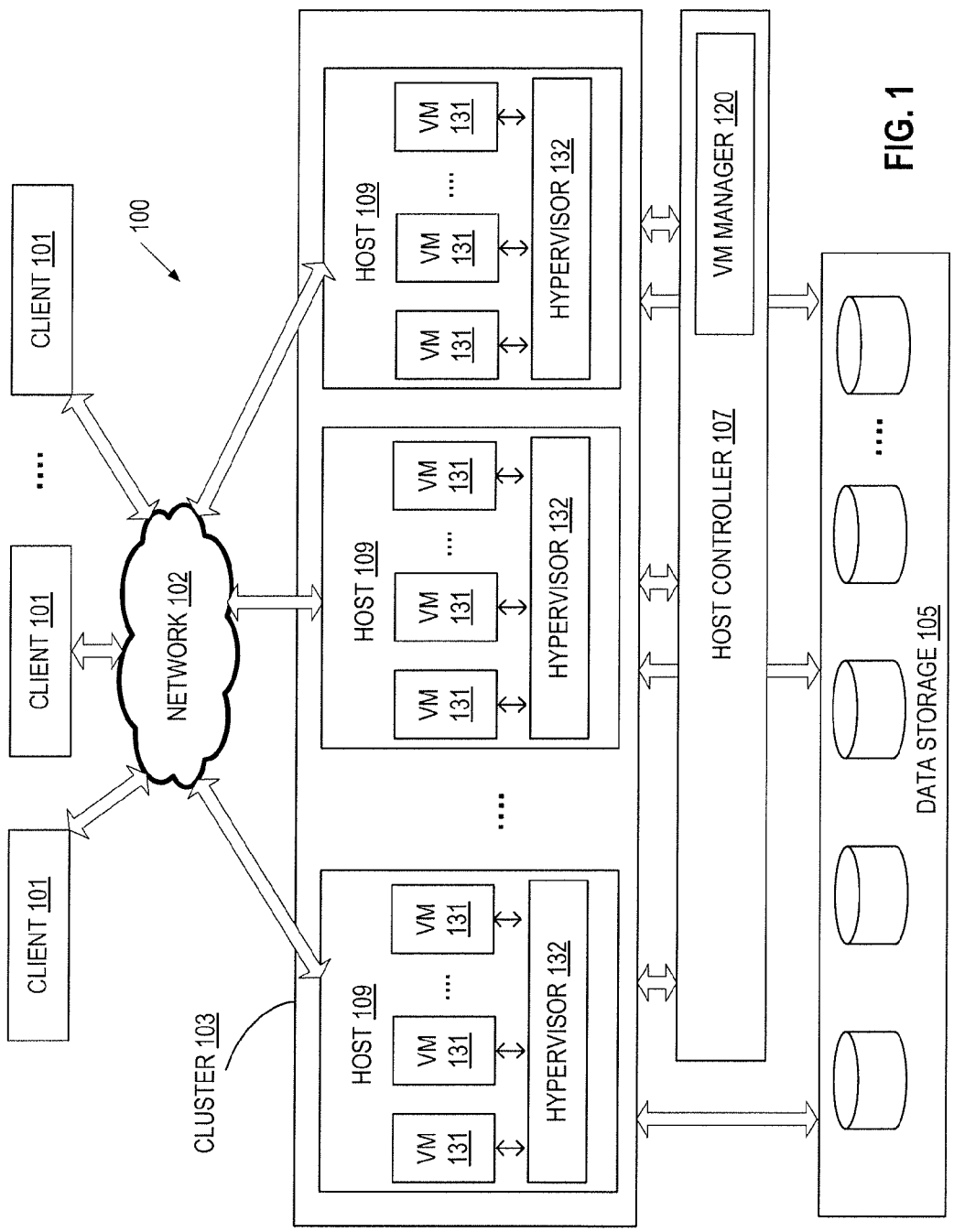
FIG. 1 is a block diagram illustrating one embodiment of a host cluster controlled by a host controller.

FIG. 1 illustrates an exemplary network architecture 100 in which embodiments of the present invention may operate. The network architecture 100 includes a cluster of hosts 103 (also referred to as "a cluster") coupled to one or more clients 101 over a network 102. The network 102 may be a private network (e.g., a local area network (LAN), a wide area network (WAN), intranet, etc.) or a public network (e.g., the Internet). The cluster 103 includes a plurality of host computers 109 (also referred to as "hosts"). The cluster 103 is also coupled to data storage 105. The data storage 105 includes one or more mass storage devices (e.g., disks), which form a storage pool shared by all of the hosts 109 in the cluster 103.

Each host 109 may host one or more virtual machines 131. Each virtual machine 131 runs a guest operating system (OS) that may be different from one virtual machine to another. The guest OS may include Microsoft Windows®, Linux®, Solaris®, Mac® OS, etc. Each host 109 may include a hypervisor 132 that emulates the underlying hardware platform for the virtual machines 131. The hypervisor 132 may also be known as a virtual machine monitor (VMM) or a kernel-based hypervisor. In some embodiments, the hypervisor 132 is part of a host operating system.

The clients 101 may include computing devices that have a wide range of processing capabilities. The clients 101 may access the virtual machines 131 over the network 102. In one scenario, each virtual machine 131 provides a virtual desktop for the client 101. From the user's point of view, the virtual desktop functions as a physical desktop (e.g., a personal computer) and is indistinguishable from a physical desktop.

The hosts 109 can be managed by a host controller 107. The host controller 107 may be a computer coupled to the cluster 103 directly or via a network. Alternatively, the host controller 107 may be part of one of the hosts 109. The host controller 107 may add a virtual machine, remove a virtual machine, balance the load in the cluster 103, power on/off the hosts 109, provide directory service to the virtual machines 131, and perform other managerial functions.

According to one embodiment of the present invention, the host controller 107 includes a virtual machine (VM) manager 120 to monitor and manage the virtual machines 131. The VM manager 120 identifies the virtual machines 131 that are designated as highly available. For example, each virtual machine 131 may be associated with configuration information that indicates whether or not it is highly available. A virtual machine that is designated as highly available needs to maintain minimal down time, unless it is intentionally stopped by a user. To ensure that the virtual machine runs as much of the time as possible, the host controller 107 monitors the virtual machine and re-runs the virtual machine when the virtual machine fails.

Figure 2:
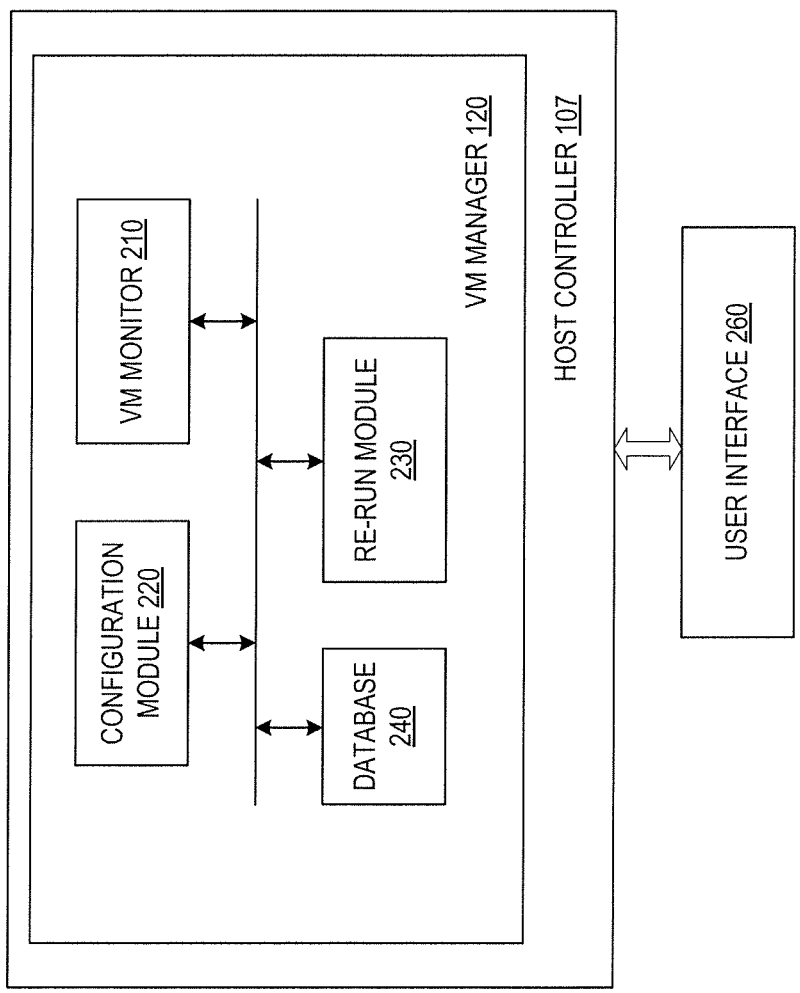
FIG. 2 is a block diagram illustrating one embodiment of a virtual machine manager in the host controller of FIG. 1.

FIG. 2 illustrates an embodiment of the VM manager 120 in the host controller 107. The VM manager 120 includes a VM monitor 210 to monitor the status of the virtual machines 131. For example, the status of the virtual machine 131 may be active, suspended, stopped, or failed. The VM manager 120 maintains configuration data of the virtual machine 131 in a configuration module 220. The configuration data contains information that indicates whether each virtual machine 131 is highly available. The VM manager 120 also includes a re-run module 230 to re-run highly available virtual machines. In one embodiment, the re-run module 230 re-runs a highly available virtual machine that fails when there is a change in system resources. The re-run can be automatically triggered, without any user interaction, when a change in system resources is detected. The system resources may include CPU utilization, memory capacity, the number of available processors or hosts, etc. The VM manger 120 also maintains a database 240 to keep track of the reason that a virtual machine 131 stops running. For example, the virtual machine 131 may be stopped by a user or may fail because of an error. In the discussions that follow, a virtual machine that is stopped by a user is not considered a failed virtual machine. A failed virtual machine, as described herein, refers to a virtual machine that is terminated in error (e.g., due to a power failure, hardware/software error, etc.). The database 240 may be stored in a memory or other data storage device (e.g., the data storage 105 of FIG. 1).

In one embodiment, multiple highly virtual machines may have failed. Each of these virtual machines may be associated with a priority, and the priority as well as the reason for its failure may have been recorded in the database 240. When there is a change in system resources, the re-run module 230 can re-run these virtual machines based on their priorities. In one embodiment, a user (e.g., a system administrator) may set a priority to each virtual machine that he creates. When there are multiple highly available virtual machines to be re-run, the one with higher priority will be re-run first, followed by the ones with lower priorities. That is, these failed virtual machines will be re-run based on their priorities. If there are insufficient system resources to re-run all of the failed highly available virtual machines, the re-run of the lower priority ones may be delayed until a later time.

In one embodiment, the host controller 107 is coupled to a user interface device 260 (e.g., a display that provides a graphical user interface) to receive user requests and inputs, including updates to the configurable data of the virtual machines 131 (e.g., virtual machine priorities). The user interface device 260 can also display the current status of each virtual machine 131 to a user.

Figure 3:
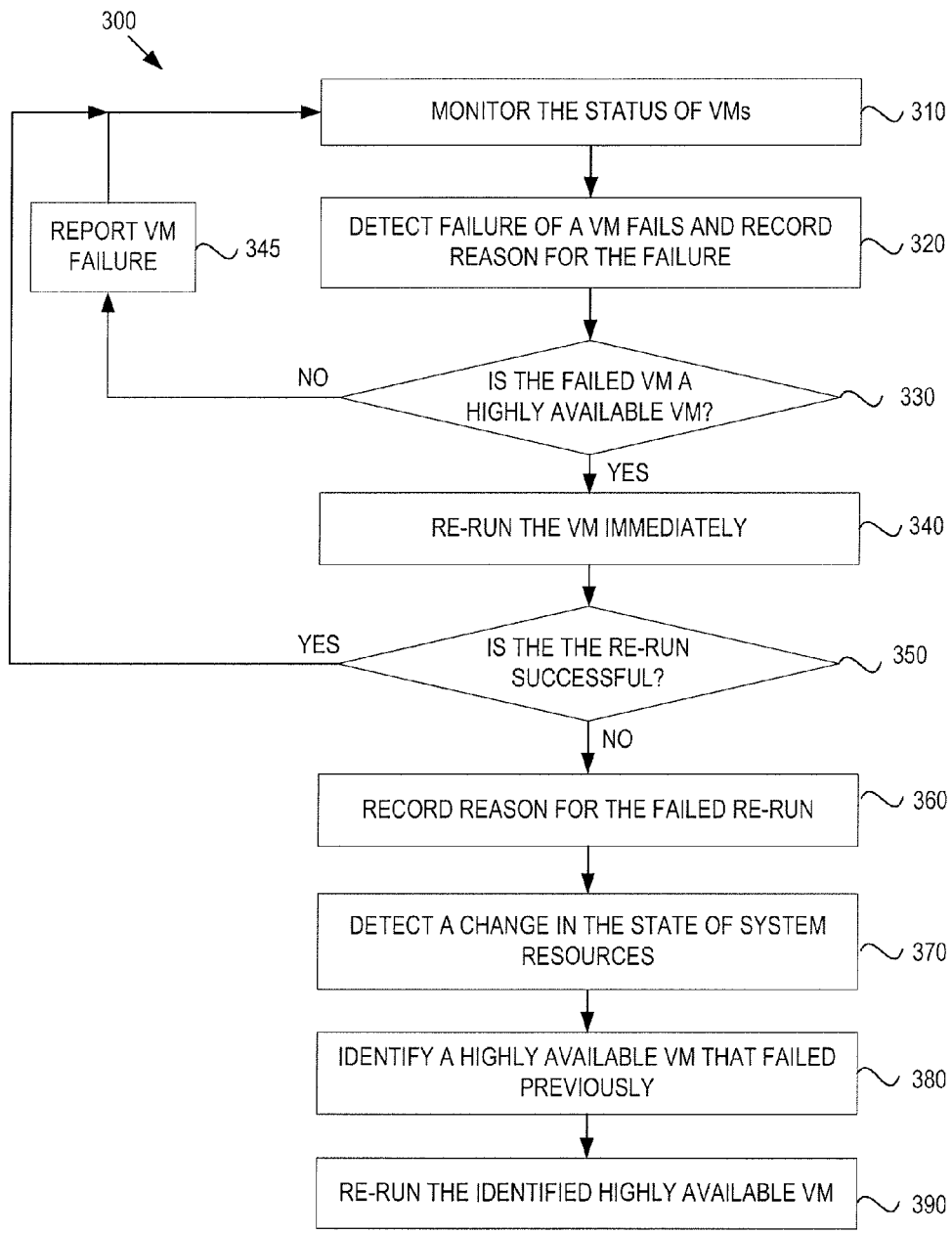
FIG. 3 is a flow diagram illustrating a method for re-running a highly available virtual machine, in accordance with one embodiment of the present invention.

FIG. 3 is a flow diagram illustrating one embodiment of a method 300 for re-running a highly available virtual machine. The method 300 may be performed by a computer system 500 of FIG. 5 that may comprise hardware (e.g., circuitry, dedicated logic, programmable logic, microcode, etc.), software (e.g., instructions run on a processing device), or a combination thereof. In one embodiment, the method 300 is performed by the VM manager 120 (FIGS. 1 and 2).

Referring to FIG. 3, in one embodiment, the method 300 begins when the VM manager 120 monitors the status of the virtual machines 131 (block 310). Each of the virtual machines may be associated with a priority set by a user. In one embodiment, the VM manager 120 may poll each host 109 periodically to check the status of the virtual machines 131. When the VM manager 120 detects that a virtual machine fails, the VM manager 120 records the reason of failure in the database 240 (block 320). The recorded reason indicates that the highly available virtual machine has failed in error. The VM manager 120 then determines (e.g., from the configuration data) whether the failed virtual machine is a highly available virtual machine (block 330). If the failed virtual machine is a highly available virtual machine, the VM manager 120 attempts to re-run the failed virtual machine immediately (block 340). It the failed virtual machine is not highly available, the VM manager 120 reports the failure (block 345) and continues to monitor the status of the virtual machines 131 in the cluster 103 (block 310).

If the failed virtual machine can be re-run successfully (block 350), the VM manager 120 continues to monitor the status of the virtual machines 131 in the cluster 103 (block 310). Otherwise, the VM manager 120 records the reason for the failed re-run in memory, e.g., in the database 240 (block 360). The recorded reason indicates that the highly available virtual machine has failed again in error, which means that the failed virtual machine is waiting to be re-run. The priority of the failed virtual machine may also be recorded in the database 240. The VM manager 120 then continues monitoring the system until it detects a change in the system resources (block 370). For example, the VM manager 120 may detect that another virtual machine stops running (e.g., terminated by a user). The stopped virtual machine may release system resources, such as CPU cycles and/or memory. Alternatively, the VM manager 120 may detect that a host has just started running (that is, has moved from a non-active state to an up state). The starting of a host indicates that additional system resources have been added to the cluster 103. When a change of system resources is detected, the VM manager 120 identifies those highly available virtual machines that failed previously and are waiting to be re-run (block 380). In one embodiment, the VM manager 120 may examine the status of each highly available virtual machine to determine whether it has failed and is waiting to be re-run. The status of the highly available virtual machine may be obtained from the database 240; for example, by examining the previously recorded reasons for failure. The VM manager 120 then re-runs the identified virtual machines (block 390). In one embodiment, the re-run is based on the priorities of the virtual machines. A virtual machine with higher priority will be re-run before a virtual machine with lower priority. By re-running a virtual machine upon detection of a resource change, the chances of success are greatly improved.

Figure 4A:
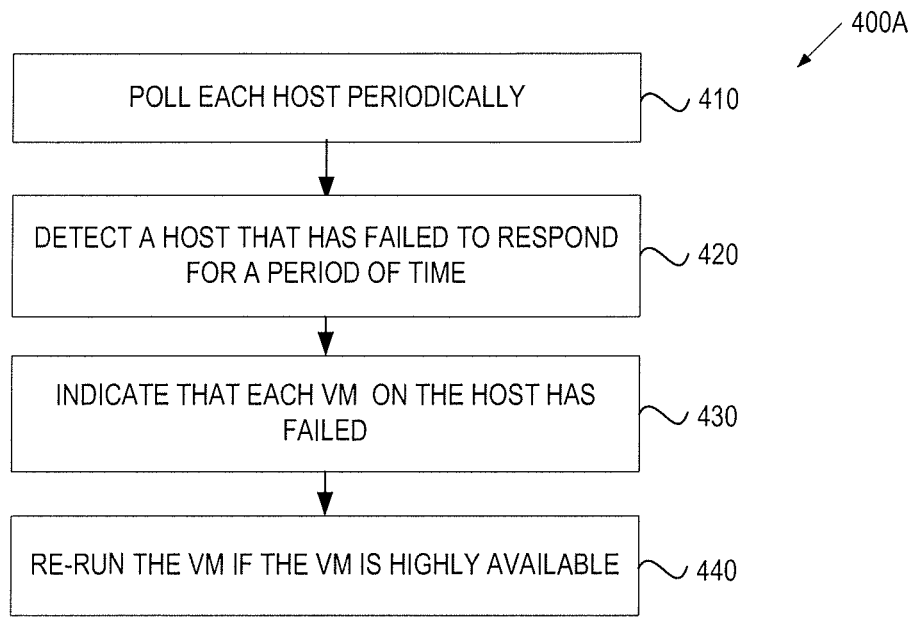
FIG. 4A is a flow diagram illustrating a method for detecting a failure of a virtual machine, in accordance with one embodiment of the present invention.
Figure 4B:
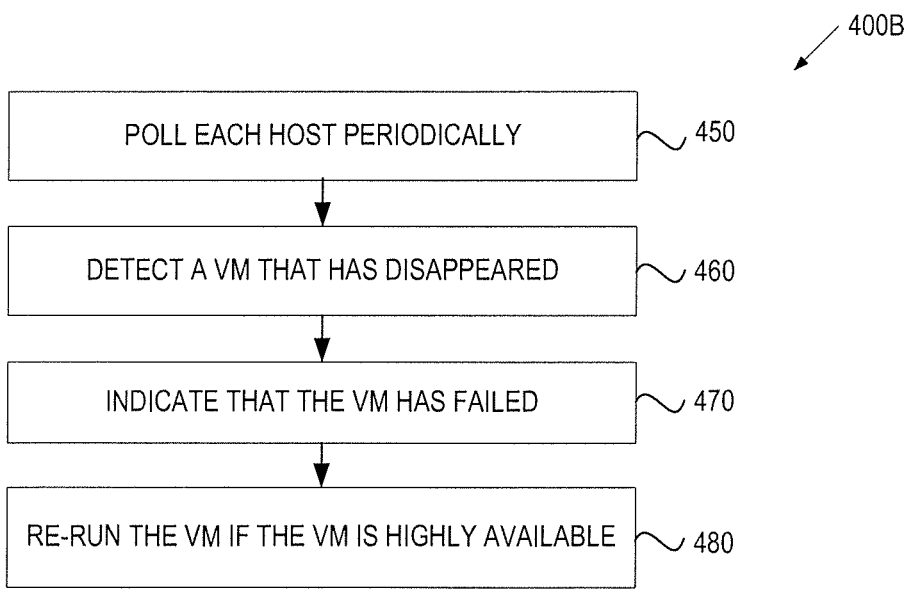
FIG. 4B is a flow diagram illustrating another method for detecting a failure of a virtual machine, in accordance with one embodiment of the present invention.

FIGS. 4A and 4B are flow diagrams illustrating embodiments of methods 400A and 400B for detecting the failure of a virtual machine. The methods 400A and 400B may be performed by the computer system 500 of FIG. 5 that may comprise hardware (e.g., circuitry, dedicated logic, programmable logic, microcode, etc.), software (e.g., instructions run on a processing device), or a combination thereof. In one embodiment, the methods 400A and 400B can be performed by the VM manager 120 (FIGS. 1 and 2).

Referring to FIG. 4A, in one embodiment, the method 400A begins when the VM manager 120 periodically polls each host 109 in the cluster 103 (block 410). In one embodiment, the VM manager 120 may poll each host 109 every few seconds (e.g., every two seconds). The host 109, in response to the polling, reports the status of the virtual machines that it hosts. At some point of time, one of the hosts 109 may fail to respond to the polling for a pre-determined amount of time (block 420). In return, the VM manager 120 marks each virtual machine that runs on the unresponsive host as failed (block 430). The VM manager 120 then re-runs the failed virtual machine according to the method 300 of FIG. 3 if the failed virtual machine is highly available (block 440).

Referring to FIG. 4B, in one embodiment, the method 400B begins when the VM manager 120 periodically polls each host 109 in the cluster 103 (block 450). In one embodiment, the VM manager 120 may poll each host 109 every few seconds (e.g., every two seconds). The host 109, in response to the polling, reports the status of the virtual machines that it hosts. The VM manager 120 keeps tracks of the status of all of the virtual machines 130. At some point of time, one of the hosts 109 may report that it hosts no virtual machines, which is contrary to the record maintained by the VM manager 120 (block 460). This situation may occur when the host is rebooted (e.g., in response to a host command or due to a power failure). When a host is rebooted, it is non-responding and its virtual machines are in an unknown state. After the host returns to an up state, the host will report to the VM manager 120 that no virtual machines are running on it. As a result, the virtual machines on a rebooted host disappear from the point of view of the VM manager 120.

Once the disappearance of a virtual machine is detected, the VM manager 120 marks the disappeared virtual machine as failed (block 470). The VM manager 120 then re-runs the failed virtual machine according to the method 300 of FIG. 3 if the failed virtual machine is highly available (block 480).

Figure 5:
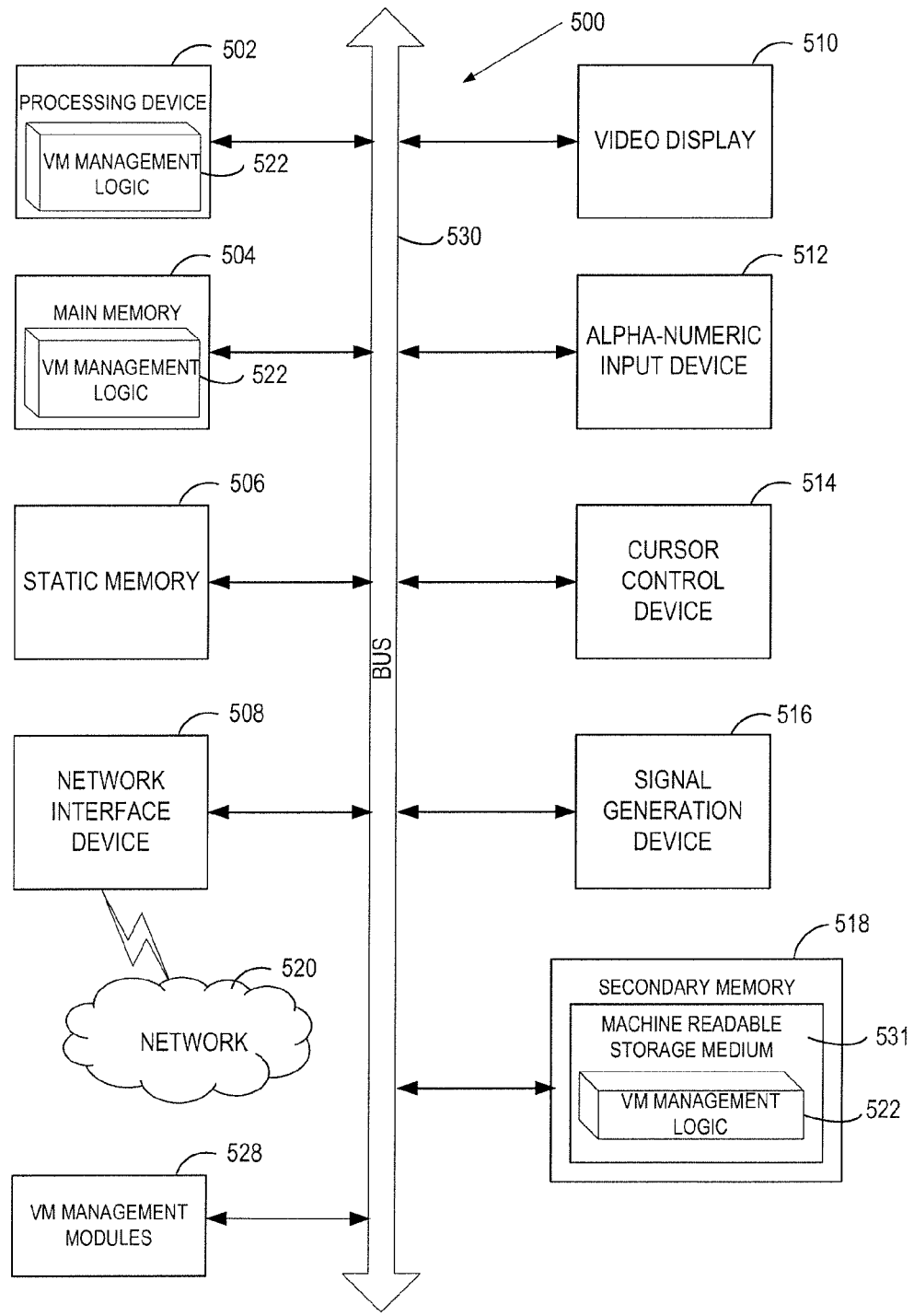
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute VM management logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., VM management logic 522) embodying any one or more of the methodologies or functions described herein (e.g., the VM manager 120 of FIGS. 1 and 2). The VM management logic 522 may also reside, completely or at least partially, within the main memory 504 and/or within the processing device 502 during execution thereof by the computer system 500; the main memory 504 and the processing device 502 also constituting machine-readable storage media. The VM management logic 522 may further be transmitted or received over a network 520 via the network interface device 508.

The machine-readable storage medium 531 may also be used to store the VM management logic 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 500 may additionally include VM management modules 528 for implementing the functionalities of the VM manager 120 of FIGS. 1 and 2. The module 528, components and other features described herein (for example in relation to FIG. 1) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "detecting", "identifying", "re-running", "recording", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, implemented by a host controller, the method comprising:
   monitoring, by the host controller, a status of a highly available virtual machine of a plurality of virtual machines running on a plurality of host computers to detect a failure of the highly available virtual machine, the highly available virtual machine designated to maintain minimal down time;
   detecting, by the host controller, a change in system resources of the plurality of host computers, the host controller coupled to the plurality of host computers;
   determining, based on the monitored status, that the highly available virtual machine has failed during runtime and prior to the change in the system resources; and
   upon detecting the change in the system resources, re-running, by the host controller, the highly available virtual machine that failed during runtime and prior to the change in the system resources, to minimize the down time of the highly available virtual machine.

2. The method of claim 1, wherein, prior to the detection of the change in the system resources, the method further comprises:
   detecting the failure of the highly available virtual machine; and
   re-running the highly available virtual machine immediately.

3. The method of claim 1, further comprising:
   recording a reason for failure of the highly available virtual machine in a database.

4. The method of claim 1, wherein detecting a change further comprises:
   detecting that one of the host computers has moved from a non-active state to an up state; and
   upon detecting the up state of the one of the host computers, re-running the highly available virtual machine.

5. The method of claim 1, wherein detecting a change further comprises:
   detecting that an existing virtual machine stops; and
   upon detecting that the existing virtual machine stops, re-running the highly available virtual machine.

6. The method of claim 1, further comprising:
   detecting that one of the host computers has not responded for a period of time; and
   indicating that each virtual machine on the one of the host computers has failed.

7. The method of claim 1, further comprising:
   detecting that one of the virtual machines disappeared; and
   indicating that the one of the virtual machines has failed.

8. A system comprising:
   a host controller coupled to a plurality of host computers that host a plurality of virtual machines, the host controller to monitor a status of a highly available virtual machine of the plurality of virtual machines to detect a failure of the highly available virtual machine, the highly available virtual machine designated to maintain minimal down time, to a change in system resources of the plurality of host computers, to determine, based on the monitored status, that the highly available virtual machine has failed during runtime and prior to the change in the system resources, and to re-run the highly available virtual machine that failed during runtime and prior to the change in the system resources, upon detection of the change in the system resources, to minimize the down time of the highly available virtual machine; and
   data storage to store information regarding whether each of the plurality of virtual machines is highly available.

9. The system of claim 8, wherein the data storage stores a reason for failure of the highly available virtual machine.

10. The system of claim 8, wherein the host controller detects the change in the system resources when one of the host computers has moved from a non-active state to an up state.

11. The system of claim 8, wherein the host controller detects the change in the system resources when an existing virtual machine stops.

12. The system of claim 8, wherein the host controller manages each virtual machine on an unresponsive host computer as a failed virtual machine.

13. The system of claim 8, wherein the host controller manages a disappeared virtual machine as a failed virtual machine.

14. A non-transitory computer readable storage medium including instructions that, when executed by a processing system, cause the processing system to perform a method comprising:

monitoring, by the host controller, a status of a highly available virtual machine of a plurality of virtual machines running on a plurality of host computers to detect a failure of the highly available virtual machine, the highly available virtual machine designated to maintain minimal down time;

detecting, by the host controller, a change in system resources of the plurality of host computers, the host controller coupled to the plurality of host computers;

determining, based on the monitored status, that the highly available virtual machine has failed during runtime and prior to the change in the system resources; and upon detecting the change in the system resources, re-running, by the host controller, the highly available virtual machine that failed during runtime and prior to the change in the system resources, to minimize the down time of the highly available virtual machine.

15. The non-transitory computer readable storage medium of claim 14, wherein, prior to the detection of the change in the system resources, the method further comprises:

detecting the failure of the highly available virtual machine; and re-running the highly available virtual machine immediately.

16. The non-transitory computer readable storage medium of claim 14, wherein, upon detection of the change of the system resources, the method further comprises:

re-running a plurality of highly available virtual machines based on their priorities.

17. The non-transitory computer readable storage medium of claim 14, wherein detecting a change further comprises:

detecting that one of the host computers has moved from a non-active state to an up state; and upon detecting the up state of the host computer, re-running the highly available virtual machine.

18. The non-transitory computer readable storage medium of claim 14, wherein detecting a change further comprises:

detecting that an existing virtual machine stops; and upon detecting that the existing virtual machine stops, re-running the highly available virtual machine.

19. The non-transitory computer readable storage medium of claim 14, further comprising:

detecting that one of the host computers has not responded for a period of time; and indicating that each virtual machine on the host computer has failed.

20. The non-transitory computer readable storage medium of claim 14, further comprising:

detecting that one of the virtual machines has disappeared; and indicating that the one of the virtual machines has failed.

* * * * *